United States Patent
Matsushita

(10) Patent No.: US 10,184,781 B2
(45) Date of Patent: Jan. 22, 2019

(54) DISPLACEMENT DETECTING DEVICE

(71) Applicant: DMG MORI CO., LTD., Yamatokoriyama-shi, Nara (JP)

(72) Inventor: Kenji Matsushita, Kanagawa (JP)

(73) Assignee: DMG MORI CO., LTD. (JP)

( * ) Notice: Subject to any disclaimer, the term of this patent is extended or adjusted under 35 U.S.C. 154(b) by 0 days.

(21) Appl. No.: 15/648,740

(22) Filed: Jul. 13, 2017

(65) Prior Publication Data

US 2018/0017373 A1    Jan. 18, 2018

(30) Foreign Application Priority Data

Jul. 15, 2016   (JP) .................................. 2016-140429

(51) Int. Cl.
| | |
|---|---|
| *G01B 11/02* | (2006.01) |
| *G01B 9/02* | (2006.01) |
| *G01D 5/38* | (2006.01) |
| *G01B 11/14* | (2006.01) |

(52) U.S. Cl.
CPC .......... *G01B 9/02034* (2013.01); *G01B 11/14* (2013.01); *G01D 5/38* (2013.01)

(58) Field of Classification Search
CPC ............ G01B 9/02034; G01B 9/02017; G01B 9/02019; G01B 2290/45; G01B 2290/70; G01B 11/14
USPC .................................................. 356/493, 499
See application file for complete search history.

(56) References Cited

U.S. PATENT DOCUMENTS

| | | | |
|---|---|---|---|
| 4,930,895 A | 6/1990 | Nishimura et al. | |
| 5,532,819 A | * | 7/1996 | Ishizuka .................. G01D 5/38 |
| | | | 250/237 G |
| 2003/0174344 A1 | * | 9/2003 | Jones ..................... G01D 5/38 |
| | | | 356/616 |
| 2006/0145066 A1 | | 7/2006 | Tamiya |
| 2011/0310396 A1 | | 12/2011 | Tamiya |

(Continued)

FOREIGN PATENT DOCUMENTS

| | | |
|---|---|---|
| JP | 63-311121 A | 12/1988 |
| JP | 2000-081308 A | 3/2000 |

OTHER PUBLICATIONS

European Search Report for Application No. 17181125.0 dated Dec. 14, 2017.

*Primary Examiner* — Tarifur R Chowdhury
*Assistant Examiner* — Jonathon Cook
(74) *Attorney, Agent, or Firm* — Katten Muchin Rosenman LLP

(57) ABSTRACT

The purpose of the present invention is to provide a displacement detecting device capable of decreasing a measurement error, even when a diffraction grating is inclined or displaced to a direction other than a measuring direction. The displacement detecting device 1 comprising: a light source 2 for emitting light; a polarized beam splitter 7; a diffraction grating 11; a prism unit 16A (16 to 19) for shifting light path; lenses 14 and 20 for correcting light path; and an interfered light receiving unit 22A (22 to 30). The prism unit 16A for shifting light path shifts first diffracted light to a direction vertical to the measuring direction. The lenses 14 and 20 for correcting light path is arranged on a symmetrical axis of light paths and corrects light path when the diffraction grating 11 is inclined or moved to a normal direction of a grating surface.

4 Claims, 11 Drawing Sheets

(56) References Cited

U.S. PATENT DOCUMENTS

2013/0114061 A1* 5/2013 de Groot ............... G01D 5/266
                                                        355/72

* cited by examiner

DISPLACEMENT DETECTING DEVICE

RELATED APPLICATIONS

The present application claims priority based on Japanese Patent Application No. 2016-140429 filed in Japan on Jul. 15, 2016, which is incorporated by reference herein.

FIELD OF THE INVENTION

The present invention relates to a displacement detecting device for detecting a relative moving position of a movable part of a machine tool or a semiconductor manufacturing device and else.

DESCRIPTION OF RELATED ART

In the past, a device for performing displacement measurement optically by using light source such as LED and a grating forming periodic light-dark or unevenness is widely used as a measuring instrument for performing precise measurement of linear displacement or rotational displacement.

As a conventional displacement detecting device of this kind, there are devices, for example as described in patent documents 1 and 2. In the displacement detecting device described in the patent document 1, a light irradiated from a light source enters into a diffraction grating and generates two diffracted lights emitted obliquely, and these diffracted lights are irradiated again to the diffraction grating to obtain interfered light by superposing and interfering re-diffracted diffracted lights. And, a displacement of the diffraction grating is detected by receiving the interfered light by a light receiving element.

On the other hand, in a displacement detecting device as described in the patent document 2, a light irradiated from a light source enters into a diffraction grating from oblique direction and generates two once diffracted lights emitted vertically. Also, these diffracted lights are irradiated again to the diffraction grating to obtain interfered light by superposing and interfering re-diffracted diffracted lights. And, a displacement of the diffraction grating is detected by receiving the interfered light by a light receiving element.

Patent Document 1: Japanese Patent No. 4023923. Patent Document 2: Japanese Patent Application Laid-Open No. S63-311121

SUMMARY OF THE INVENTION

However, in the displacement detecting device described in the patent document 1 and 2, there was a problem that a measurement error occurs when the diffraction grating is inclined or displaced to a direction other than a measuring direction. In other words, in the displacement detecting device described in the patent document 1, when the diffraction grating moves in a normal direction of a grating surface, a central axis of lens for correcting light path and a symmetric axis of two light paths will be deviated, so by the inclination of the diffraction grating, there will be difference in light path length of two light paths and large error occurs.

On the other hand, in the displacement detecting device described in the patent document 2, no deviation occurs to a central axis of lens for correcting light path and a symmetric axis of two light paths when the diffraction grating moves in a normal direction of a grating surface, but it is not defined to locate a focus of the lens for correcting light path on a grating surface, so correction of light path will be effective only in an infinitesimal range. Also, lateral magnification of an optical system for correction (grating surface-lens-grating surface) is not single, so when the diffraction grating inclines, a first incident point and a second incident point to the diffraction grating will be asymmetrical with respect to the symmetrical axis of the light paths, and large error is caused by occurrence of difference in light path length of two light paths. Also, in the displacement detecting device described in the patent document 2, there was a problem that diffracted light with degree other than ±m degree used for displacement measurement will be mixed in, and causes measurement error.

The present invention is invented considering the above problems, the purpose of the present invention is to provide a new and improved displacement detecting device capable of preventing a mixing of diffracted light with unnecessary degree into light path, and also, capable of decreasing a measurement error certainly even when a diffraction grating is inclined or displaced to a direction other than a measuring direction.

An embodiment of the present invention is a displacement detecting device for detecting relative displacement in one direction of a measuring object by a movement of a diffraction grating, comprising: a light source for emitting coherent light; a collimate lens for making the coherent light emitted from the light source into parallel light flux; a light flux splitting element for splitting collimate light, which has been made into parallel light flux by the collimate lens, into two light fluxes; deflection mirrors for deflecting each of split light fluxes to enter the diffraction grating at prescribed angle; two lenses for correcting light path with equal focus distance arranged in light path of the light fluxes; a prism unit for shifting light path to reenter first diffracted light, which is diffracted in the diffraction grating, into the diffraction grating by moving in parallel the light path of the first diffracted light to a vertical direction with respect to a measuring direction; an interfered light receiving unit for receiving light by interfering diffracted light, which was moved in parallel in the prism unit for shifting light path, re-diffracted in the diffraction grating and superposed in the light flux splitting element; and a relative position detector for outputting displacement information of the diffraction grating based on interfered light intensity, wherein each of the light fluxes split in two by the light flux splitting element enters the diffraction grating at incident angle that diffraction angle will be approximately vertical to the diffraction surface of the diffraction grating and such that the light fluxes will be symmetrical with normal line of grating surface of the diffraction grating as symmetrical axis, and the two lenses for correcting light path are arranged on the symmetrical axis, and one focus of one lens for correcting light path is on the grating surface, and another focus of one lens for correcting light path is arranged to coincide with focus of another lens for correcting light path.

According to one embodiment of the present invention, it is possible to reduce a measurement error, even when the diffraction grating inclines or displaces to a direction other than a measuring direction, by the function of the lens for correcting light path and the prism unit for shifting light path.

At this time, in one embodiment of the present invention, the prism unit for shifting light path may rotate a polarizing direction for 90 degrees by shifting the light fluxes passed through one of the lenses for correcting light path to a prescribed direction for a prescribed distance.

By such features, it is possible to reduce the measurement error, even when the diffraction grating inclines or displaces to a direction other than certain direction, as a change of entire light path length before and after the displacement or inclination will be inhibited to minimum.

Also, in one embodiment of the present invention, a shifting amount of the prescribed distance may be an avoidable distance that 0 degree diffracted light can avoid from an opening of the interfered light receiving unit.

By such features, stable and high-precision displacement detection is possible, as it is possible to prevent mixing of diffracted light with unnecessary degree into light path.

Also, in one embodiment of the present invention, the prism unit for shifting light path comprises: ¼ wavelength plate with back surface mirror; ¼ wavelength plate; a mirror; and a polarized beam splitter, and the ¼ wavelength plate with back surface mirror and the ¼ wavelength plate may be having same thickness, and also, arranged to be vertical with each other, and the polarized beam splitter may be arranged to be inclined 45 degrees with respect to horizontal direction between the ¼ wavelength plate with back surface mirror and the ¼ wavelength plate, and the mirror may be arranged in parallel with the polarized beam splitter via prescribed distance.

By such features, it is possible to reduce the measurement error, even when the diffraction grating displaces or inclines, as a change of light path length before and after the displacement or inclination could be very small by the combination of the lens for correcting light path and the prism unit for shifting light path.

As explained above, according to the present invention, it is possible to drastically reduce the measurement error, even if a position or posture of the diffraction grating changes. Also, stable and high-precision displacement detection is possible, as it is possible to prevent mixing of diffracted light with unnecessary degree into light path.

DETAILED DESCRIPTION OF THE INVENTION

Hereinafter, it is explained in detail about preferred embodiments of the present invention. In addition, the embodiments of the present invention explained in the below should not unjustly limit the content of the present invention described in claims, and not all of the features explained in the embodiments of the present invention are necessary as means for solving the problem of the present invention. Also, figurations of various lenses described in the following explanation may be any kind of figuration as long as it is having prescribed imaging performance, and it may be a single lens or a group of lenses with spherical surface or aspherical surface, or it may be a diffraction grating having imaging function.

Figure 1A:
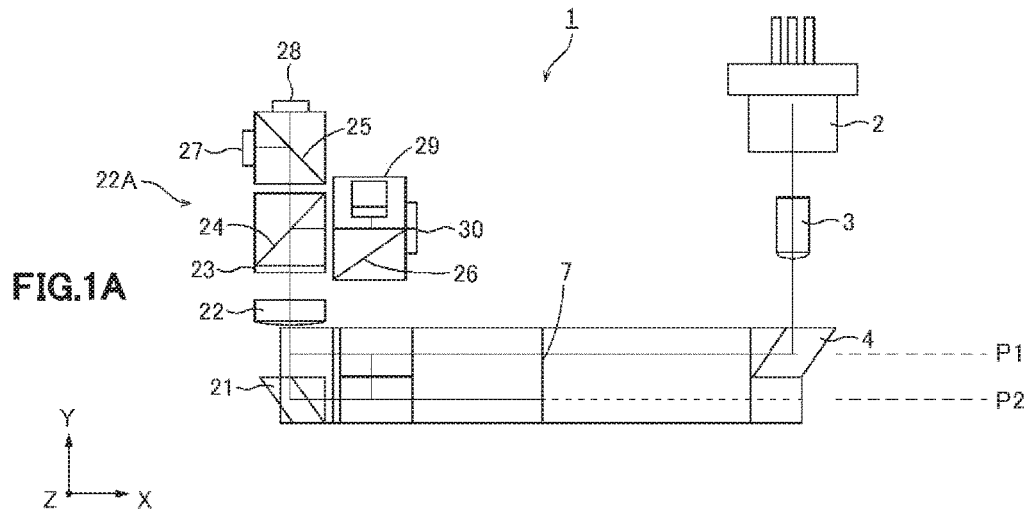
FIG. 1A to FIG. 1C are schematic block diagrams illustrating an outline of a structure of a displacement detecting device relating to one embodiment of the present invention.
Figure 1B:
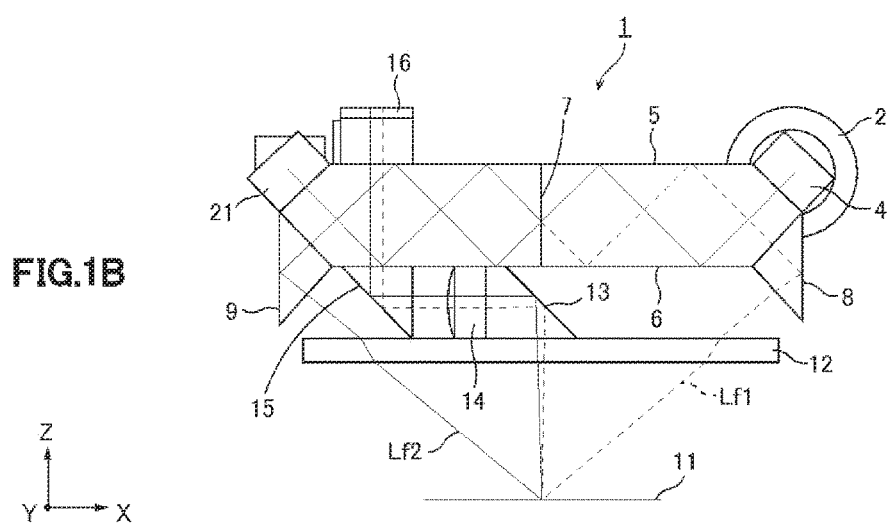
Figure 1C:
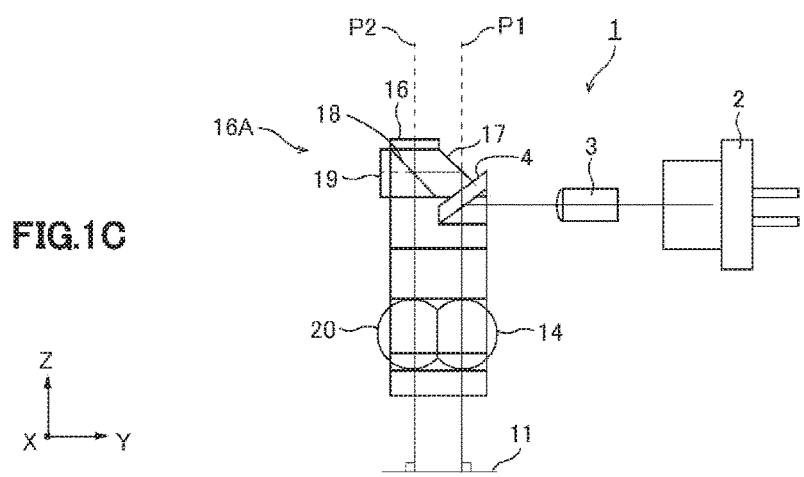

At first, explaining about the configuration of a displacement detecting device relating to one embodiment of the present invention, by using drawings. FIG. 1A to FIG. 1C are schematic block diagrams illustrating an outline of a structure of a displacement detecting device relating to one embodiment of the present invention, and FIG. 1A is a plan view of a displacement detecting device relating to one embodiment of the present invention, and FIG. 1B is a front view of a displacement detecting device relating to one embodiment of the present invention, and FIG. 1C is a side view of a displacement detecting device relating to one embodiment of the present invention.

A displacement detecting device 1 relating to one embodiment of the present invention is a device for detecting relative displacement in one direction (X direction illustrated in FIG. 1) of a diffraction grating 11 arranged in a movable part of a machine tool or a semiconductor manufacturing device and else. The displacement detecting device 1 of the present embodiment comprises: a light source 2; a collimate lens 3; a polarized beam splitter 7; a plurality of mirrors for beam deflection 4, 5, 6, 8, 9, 13, 15, 21; a diffraction grating 11; a cover glass 12 for protecting light path; two lenses 14, 20 for correcting light path with equal focus distance, a prism unit 16A (16, 17, 18, 19) for shifting light path; and an interfered light receiving unit 22A (22 to 30).

The light source 2 emits coherent light limited in coherent distance. As the light source 2, a coherent light source such as a semiconductor laser of multi-mode or super luminescent diode, but also with relatively short coherent distance, is used. However, the light source 2 is not limited to those specific types of light source.

The collimate lens 3 turns diverged beam consisting of coherent light emitted from the light source 2 into parallel flux to be collimate beam. In other words, diverged light beam emitted from the light source 2 is converted into collimate beam by the collimate lens 3.

In addition, as a position of the light source 2, it may be arranged at a position of the light source 2 illustrated in FIG. 1, or light source may be arranged in a departed position, in order to avoid influence of heat of light source, and light may be propagated using an optical fiber and an emission end of the optical fiber may be located at the position of the light source 2 illustrated in FIG. 1. Also, at this time, the diverged light beam emitted from the optical fiber is converted into collimate beam by the collimate lens. In addition, when beam from the light source is polarized directly, an optical fiber capable of holding polarized wave plane, such as polarized wave holding fiber and else, is used.

The polarized beam splitter 7 functions as a light flux splitting element for splitting collimate light converted to parallel flux by the collimate lens 3 into two beams with equal intensity (light flux Lf1, light flux Lf2). In the present embodiment, the polarized beam splitter 7 splits collimate light in such a manner that light flux at reflection side will be light flux Lf1 and that light flux at transmission side will be light flux Lf2. Deflection mirrors 8 and 9 deflect two split light flux beams Lf1 and Lf2 to enter the diffraction grating 11 at prescribed angle.

As such, light beam converted to collimate beam by the collimate lens 3 is reflected by the mirrors 4, 5, 6, which will be reflection surfaces, and enters the polarized beam splitter 7. When light emitted from the light source 2 is linearly polarized light, polarizing direction of incident light will be 45 degrees with respect to transmission polarizing direction (P polarization) of the polarized beam splitter 7. When linearly polarized light emitted from the light source 2 is converted into circularly polarized light using ¼ wavelength plate, or when emitted light is unpolarized light or circularly polarized light originally, it is not necessary to set an angle around light axis of the light source 2 in specific direction. In any case, light beam will be split to transmission side and reflection side in intensity ratio of 1:1 by the polarized beam splitter 7.

Figure 2A:
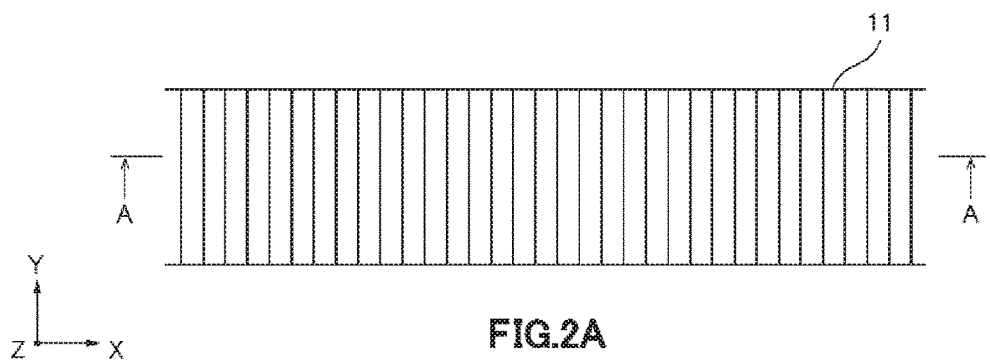
FIG. 2A is a plan view illustrating an example of a diffraction grating provided in the displacement detecting device relating to one embodiment of the present invention.
Figure 2B:
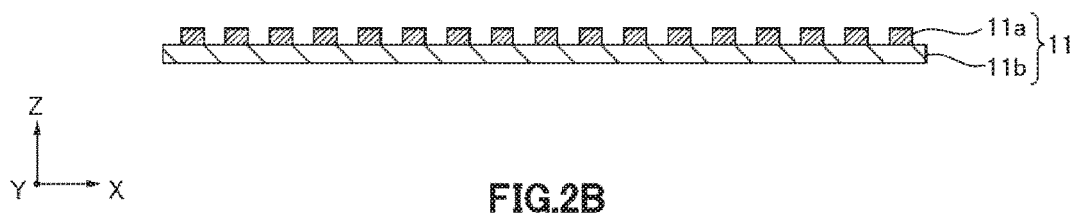
FIG. 2B is a A-A sectional view of FIG. 2A.

As illustrated in FIG. 2A and FIG. 2B, a grating structure of the diffraction grating 11 is a structure periodically changes along with X axis direction. Concretely, as illustrated in FIG. 2B, structure of the diffraction grating 11 is a structure that a protruding structure 11a is aligned at certain period $\wedge$ in X direction on a substrate 11b. Also, as illustrated in FIG. 2A, the protruding structure 11a is a structure extending in Y direction perpendicular to X axis while maintaining same sectional shape. The sectional shape of the protruding structure 11a is optimized such that intensity of ±m degree diffracted light will be maximum. In the present embodiment, incident angles of light fluxes Lf1 and Lf2 are set that angle of m degree diffracted light will be slightly different angle from normal direction of grating surface of the diffraction grating 11, and that 2 m degree diffracted light will not be returned to the light source 2. Also, incident angle seen from X axis direction will be vertical to the grating surface of the diffraction grating 11. Further, incident angle seen from the Y axis direction will be symmetrical with respect to normal line of the grating surface.

The lenses 14 and 20 for correcting light path are arranged in light path of the light flux. Concretely, lens 14 for correcting light path is arranged in light path of the light fluxes Lf1 and Lf2, and central axis of the lens 14 coincides with symmetrical axis of the light fluxes Lf1 and Lf2 when seen from Y axis direction. Also, one focus of the lens 14 for correcting light path is arranged to coincide with the grating surface of the diffraction grating 11.

Another lens 20 for correcting light path is placed on a plane same as a plane (plane P2) made by the light fluxes Lf1 and Lf2, in which light path has been shifted in Y axis direction, and when seen from Y axis direction, central axis of the lens 20 for correcting light path will be coincided with central axis of the lens 14 for correcting light path projected on the plane P2. By such features, central axis of the lens 20 will be coincided with the symmetrical axis of the light fluxes Lf1 and Lf2 extended along light path. Also, as the lenses 14 and 20 for correcting light path, lenses with equal focus distance are used, and the lenses 14 and 20 for correcting light path are arranged such that focuses thereof at convex side will be coincided and that another focus of the lens 20 for correcting light path will be arranged on the grating surface of the diffraction grating 11.

The prism unit 16A (16, 17, 18, 19) for shifting light path is having a function to reenter first diffracted light, which is diffracted in the diffraction grating 11, into the diffraction grating 11 by moving in parallel the light path of first diffracted light to vertical direction with respect to the measuring direction. Concretely, the prism unit 16A for shifting light path shifts the light fluxes Lf1 and Lf2 passed through the lens 14 for prescribed distance in Y axis direction perpendicular to the measuring direction, and rotates a polarizing direction for 90 degrees. The shift amount will be an avoidable distance that 0 degree diffracted light will deviate from an opening of the interfered light receiving unit 22A (22 to 30).

As illustrated in FIG. 1C, the prism unit 16A for shifting light path comprises: ¼ wavelength plate 16 with back surface mirror; ¼ wavelength plate 19; a mirror 17; and a polarized beam splitter 18. In the present embodiment, the ¼ wavelength plate 16 with back surface mirror and the ¼ wavelength plate 19 is having same thickness, and also, arranged to be vertical with each other. Also, the polarized beam splitter 18 is arranged to be inclined 45 degrees with respect to horizontal direction at border region between the ¼ wavelength plate 16 with back surface mirror and the ¼ wavelength plate 19, and the mirror 17 is arranged in parallel with the polarized beam splitter 18 via prescribed distance. In addition, a detailed explanation of function or operation and else of the prism unit 16A for shifting light path will be described later.

The interfered light receiving unit 22A is having a function to receive light by interfering diffracted light, which was moved in parallel in the prism unit 16A for shifting light path, re-diffracted in the diffraction grating 11 and superposed in the polarized beam splitter 7. As illustrated in FIG. 1A, the interfered light receiving unit 22A comprises: a lens 22; ¼ wavelength plate 23; an unpolarized beam splitter 24; polarized beam splitters 25 and 26; and photodiodes 27, 28, 29 and 30.

The light fluxes Lf1 and Lf2 enter into the interfered light receiving unit 22A, via common light path, after superposed again in the polarized beam splitter 7. The superposed light fluxes Lf1 and Lf2 pass through the lens 22, and narrow down so that the beam will be appropriate size on the photodiodes 27, 28, 29 and 30. After passing through lens 22, the light fluxes Lf1 and Lf2 pass through the ¼ wavelength plate 23, in which optical axis is inclined 45 degrees with respect to polarizing direction, and converted to circular polarization, in which polarization planes are rotated in opposite directions to each other.

Also, the light fluxes Lf1 and Lf2 are diffracted twice in the diffraction grating 11, so when the diffraction grating 11 moves in X axis direction, the phase the light fluxes Lf1 and Lf2 changes just for +2Kx, −2Kx respectively (K=2π/∧: grating constant). As such, light superposing lights of circular polarization rotating in opposite directions to each other can be regarded as light of linear polarization rotating according to phase difference between two lights. Therefore, after passing through the ¼ wavelength plate 23, and when the diffraction grating 11 moves only for X, the superposed light flux can be regarded as linear polarization, in which polarization plane is rotated for 2Kx (radian).

The superposed light flux is split by the unpolarized beam splitter 24, and one is directed toward polarized beam splitter 25, and another is directed toward polarized beam splitter 26. The light flux is split into S polarized component and P polarized component by the polarized beam splitter 25, and S polarized component is received by photodiode 27, and P polarized component is received by photodiode 28. When the amount of light received by the photodiodes 27 and 28 are respectively defined as $I_{27}$ and $I_{28}$, each amount of light $I_{27}$, $I_{28}$ will be as the following formula (1) and formula (2)

$$I_{27} = \frac{1}{4}a^2[1 + \sin(4K_X + \delta)] \quad (1)$$

$$I_{28} = \frac{1}{4}a^2[1 - \sin(4K_X + \delta)] \quad (2)$$

($\delta$ is initial phase)

When the diffraction grating 11 moves in X direction, interference signal fluctuating like a sinusoidal wave can be obtained, and current signals proportional to the interference signal will be output from the photodiodes 27 and 28. It can be understood from the above formula (1) and formula (2) that the signals obtained from the photodiodes 27 and 28 are inverted signals, in which the phases are different for 180 degrees to each other.

Another light flux split by the unpolarized beam splitter 24 enters the polarized beam splitter 26 rotated 45 degrees around light axis. The light flux is split into S polarized component and P polarized component by the polarized beam splitter 26, and S polarized component is received by photodiode 29, and P polarized component is received by photodiode 30. When the amount of light received by the photodiodes 29 and 30 are respectively defined as $I_{29}$ and $I_{30}$, each amount of light $I_{29}$, $I_{30}$ will be as the following formula (3) and formula (4).

$$I_{29} = \frac{1}{4}a^2[1 + \sin(4K_X - 90° + \delta)] = \frac{1}{4}a^2[1 - \cos(4K_X + \delta)] \quad (3)$$

$$I_{30} = \frac{1}{4}a^2[1 - \sin(4K_X - 90° + \delta)] = \frac{1}{4}a^2[1 + \cos(4K_X + \delta)] \quad (4)$$

$I_{27}$ and $I_{28}$ are pair of sin θ, but $I_{29}$ and $I_{30}$ are pair of cos θ the phase of which is 90 degrees deviated. $I_{27}$ and $I_{28}$, $I_{29}$ and $I_{30}$ are being inverted signals to each other, and it is possible to cancel fluctuation of current component of signals by subtraction. Also, a pair of signals of sin θ and cos θ the phases of which are deviated for 90 degrees are produced by subtraction, so it is possible to identify whether the diffraction grating 11 is moving in left or right side of X direction by method well-known in general.

These signals will be signal fluctuating for one cycle, when the diffraction grating 11 moves for ∧/4 in X direction, but it is possible to detect displacement smaller than ∧/4 precisely by calculating θ=A tan θ from signals of sin θ and cos θ.

Figure 3:
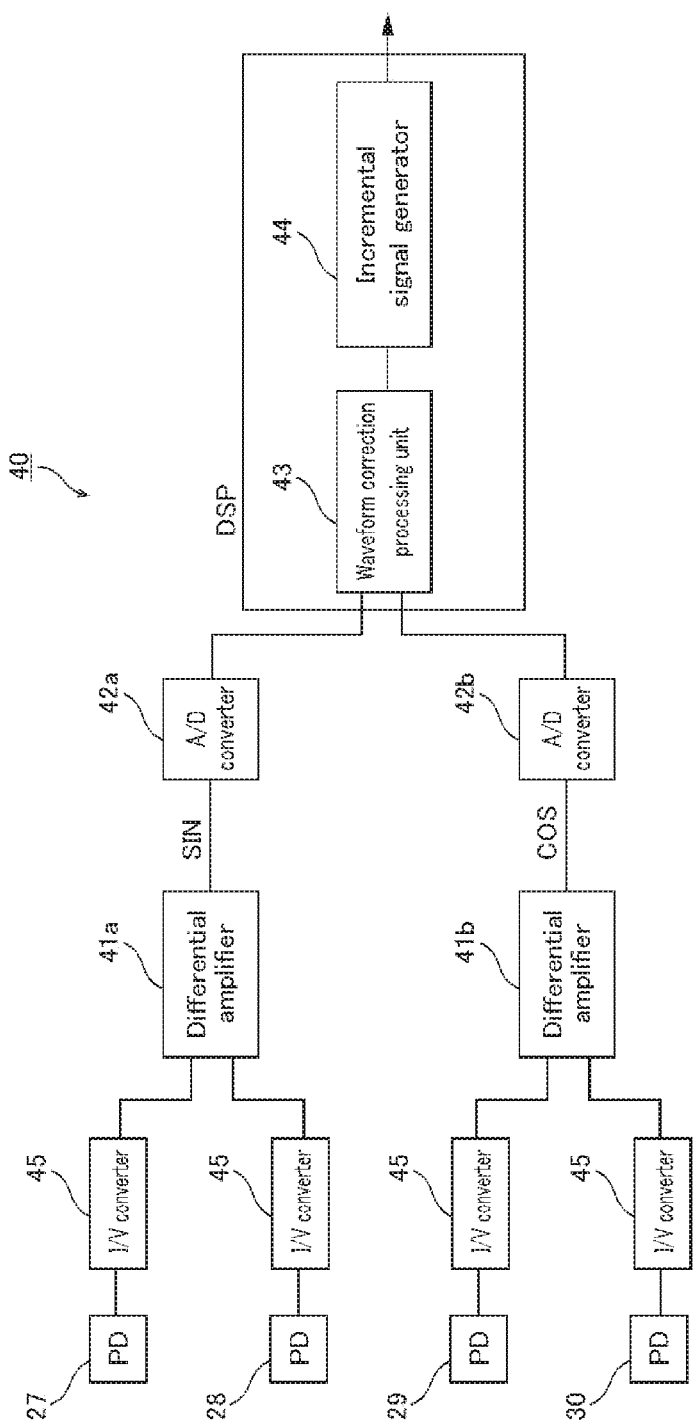
FIG. 3 is a block diagram illustrating a relative position detector in the displacement detecting device relating to one embodiment of the present invention.

The signals from the photodiodes 27, 28, 29 and 30 will be transferred to a relative position detector 40 illustrated in FIG. 3. Hereinafter, explaining about operation of the relative position detector 40 using FIG. 3.

The relative position detector 40 is having a function to output displacement information of the diffraction grating 11 based on intensity of interfered light received by the interfered light receiving unit 22A. Concretely, in the relative position detector 40, at first, signals from the photodiodes 27, 28, 29 and 30 are converted from current into voltage by a current/voltage converter 45. The voltage signals after current/voltage conversion by the current/voltage converter 45 are defined as V27, V28, V29 and V30 respectively, and creates signal of (V27-V28)*α by a first differential amplifier 41a and creates signal of (V29-V30)*β by a second differential amplifier 41b. The multiplication factors α and β are set such that amplitude of two signals after amplification will be equal, and also, that it will match a range which can be input by the following A/D converters 42a and 42b.

Two signals obtained by differential amplification by the differential amplifiers 41a and 41b are digitalized from analog sin and cos signals to digital signals by A/D converters 42a and 42b, and arithmetic processing is performed by a waveform correction processing unit 43. In the waveform correction processing unit 43 and an incremental signal generator 44, an arithmetic operation is performed by programmable logic device and else incorporated with DSP, and performs correction of phase fluctuation, offset fluctuation, and amplification fluctuation of sin θ and cos θ signals caused by turbulence of analog signals. More precise scale of position information can be generated by calculating θ=A tan θ from the corrected signals, and it is possible to generate incremental signal with necessary format. Also, it is possible to generate the incremental signal, after removing error occurred by fluctuation of previously obtained grating cycle of the diffraction grating 11 by arithmetic operation.

In the present embodiment, it is possible to reduce the occurrence of error, even when the diffraction grating 11 is displaced or inclined, by the function of lenses 14 and 20 for correcting light path. Also, two light fluxes Lf1 and Lf2 pass through both lenses 14 and 20 for correcting light path, so there is an advantage that they tend not to be influenced by variance of focus distance of the lenses 14 and 20 for correcting light path. Hereinafter, explaining about the arrangement of lenses for correcting light path of the displacement detecting device relating to one embodiment of the present invention by using drawings.

Figure 4:
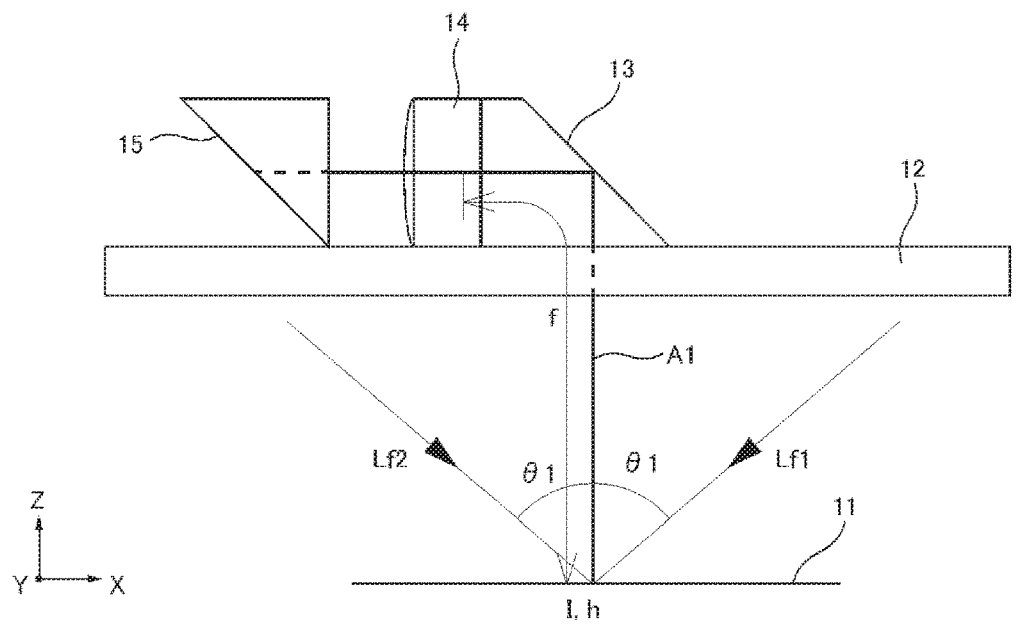
FIG. 4 is an explanatory drawing illustrating an arrangement of one lens for correcting light path in the displacement detecting device relating to one embodiment of the present invention.
Figure 5:
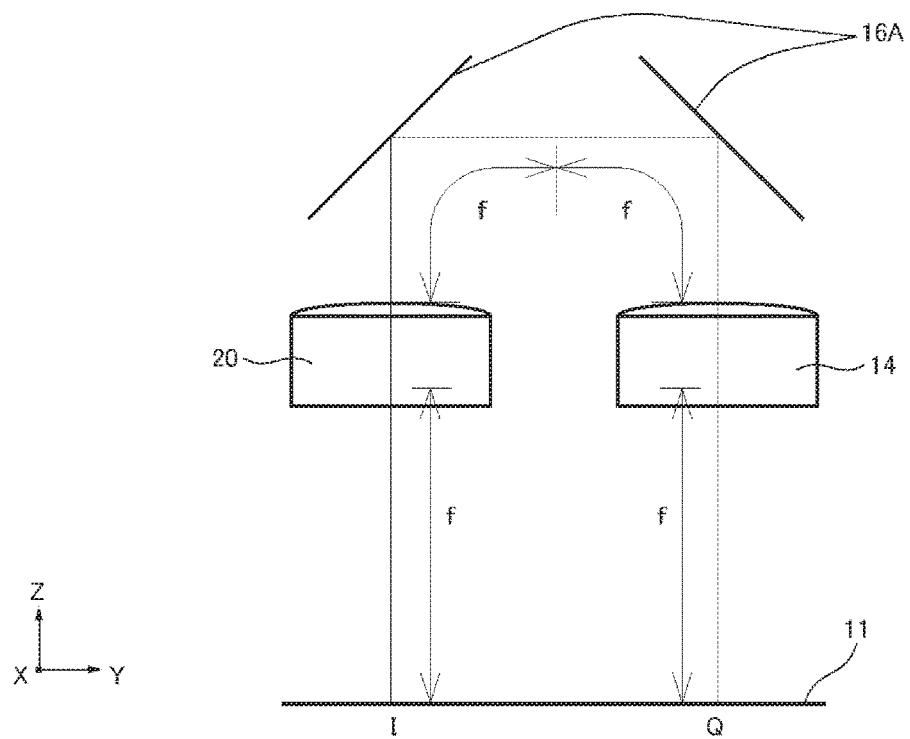
FIG. 5 is an explanatory drawing illustrating an arrangement of two lenses for correcting light path in the displacement detecting device relating to one embodiment of the present invention.
Figure 6:
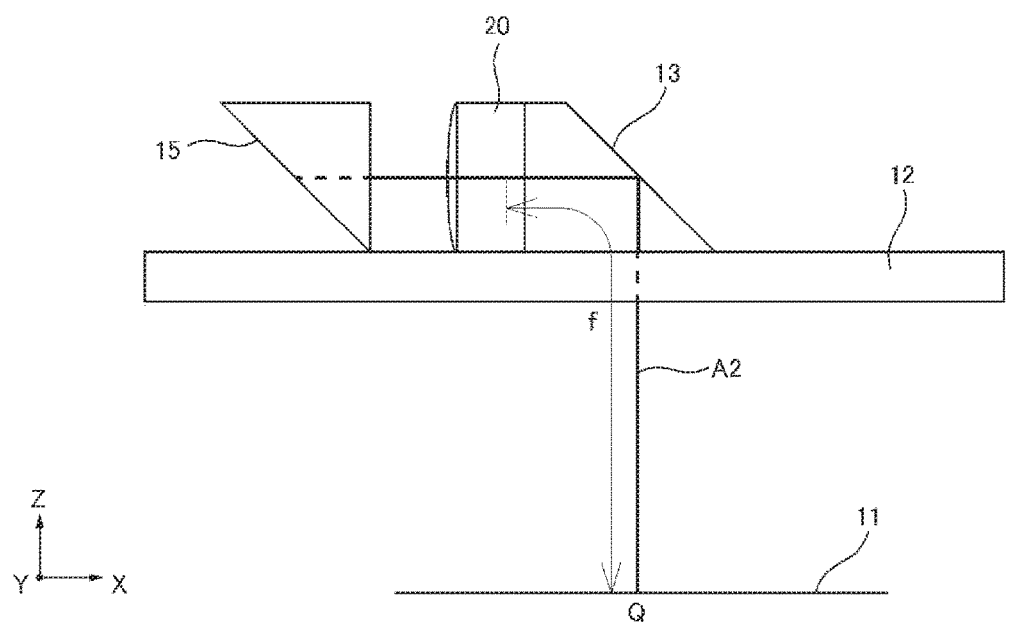
FIG. 6 is an explanatory drawing illustrating an arrangement of another lens for correcting light path in the displacement detecting device relating to one embodiment of the present invention.

FIG. 4 is an explanatory drawing illustrating an arrangement of one lens for correcting light path in the displacement detecting device relating to one embodiment of the present invention, and FIG. 5 is an explanatory drawing illustrating an arrangement of two lenses for correcting light path in the displacement detecting device relating to one embodiment of the present invention and FIG. 6 is an explanatory drawing illustrating an arrangement of another lens for correcting light path in the displacement detecting device relating to one embodiment of the present invention. In addition, FIG. 5 is a drawing of the diffraction grating 11 and the lenses 14 and 20 for correcting light path seen from X axis direction, and it is a drawing to explain only the position relation of the diffraction grating 11 and the lenses 14 and 20 for correcting light path, so it is omitting reflection by the mirrors 13 and 15 and illustrating the prism unit 16A for shifting light path by simplification.

As illustrated in FIG. 4, when seen from Y axis direction, the light fluxes enter on point h in an angle θ1, so that light fluxes Lf1 and Lf2 will be symmetrical. Incident point I of the light flux Lf1 and incident point h of the light flux Lf2 is not necessarily coincided, but it is preferable that they will be in proximity with each other, so that they will not be affected by unevenness of surface of the diffraction grating 11. If incident points I and h are spaced apart, when the diffraction grating 11 is moved to X direction, change occurs to difference of light path length of the light fluxes Lf1 and Lf2 by unevenness of the grating surface, and error occurs as information of unevenness of the grating surface superposes to the interference signal. A symmetrical axis A1 illustrated in FIG. 4 illustrates a symmetrical axis of the light fluxes Lf1 and Lf2, and it is on the plane P1 illustrated in FIG. 1A, and this symmetrical axis coincides with the central axis of the lens 14 for correcting light path. Also, one focus of the lens 14 for correcting light path coincides with the grating surface of the diffraction grating 11.

As illustrated in FIG. 5, the lenses 14 and 20 for correcting light path are arranged such that the focuses of convex side of the lenses 14 and 20 for correcting light path coincide with each other, and that another focus of the lens 20 for correcting light path coincides with the grating surface of the diffraction grating 11. Glass is inserted between the lenses 14 and 20 for correcting light path and the diffraction grating 11, and between the lens 14 for correcting light path and the lens 20 for correcting light path, so about focus position, position shift according to insertion of glass is considered.

The central axis of the lens 20 for correcting light path is on the plane P2 (refer to FIG. 1A) shifted in Y axis direction for distance between LN (refer to FIG. 7B) from the plane P1 (refer to FIG. 1A) on which the lens 14 for correcting light path is placed, and as illustrated in FIG. 6, when seen from front view direction (Y axis direction) of FIG. 4, the central axis of the lens 20 for correcting light path is arranged to coincide with axis A2 which is the central axis A1 of the lens 14 for correcting light path projected on the plane P2. By such features, the central axis of the lens 20 for correcting light path coincides with axis which is the symmetrical axis of the light fluxes Lf1 and Lf2 extended along with light path.

Figure 7A:
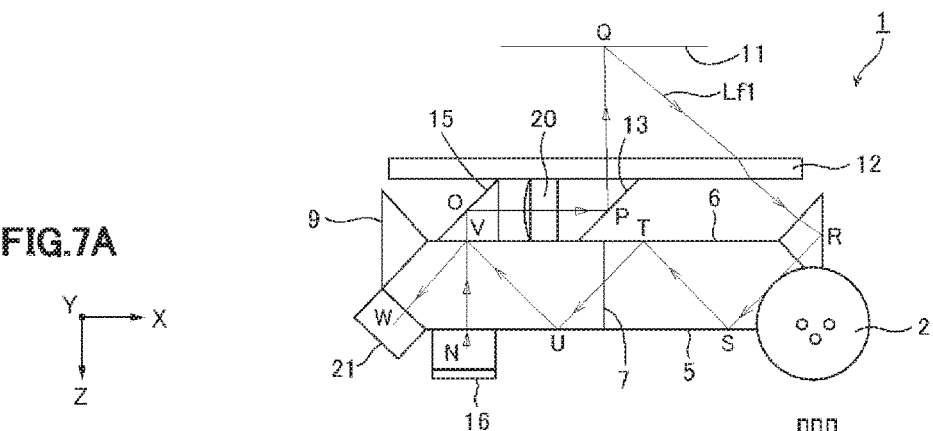
FIG. 7A to FIG. 7D are drawings illustrating light path of first light flux in the displacement detecting device relating to one embodiment of the present invention.
Figure 7B:
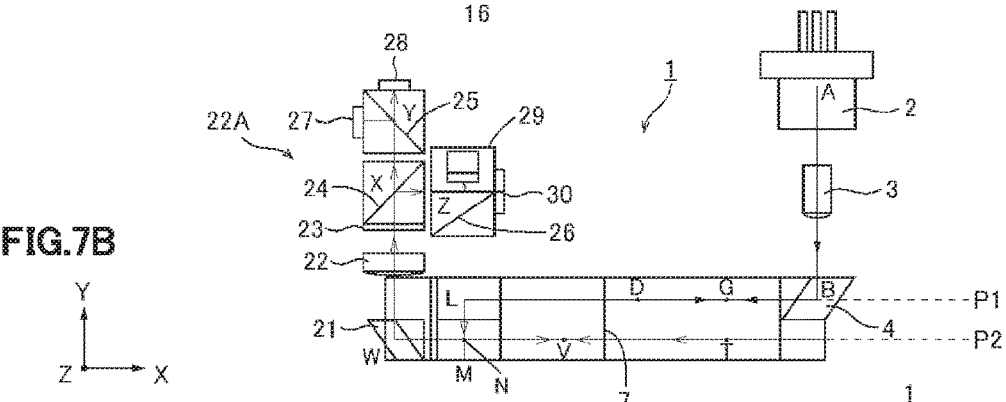
Figure 7C:
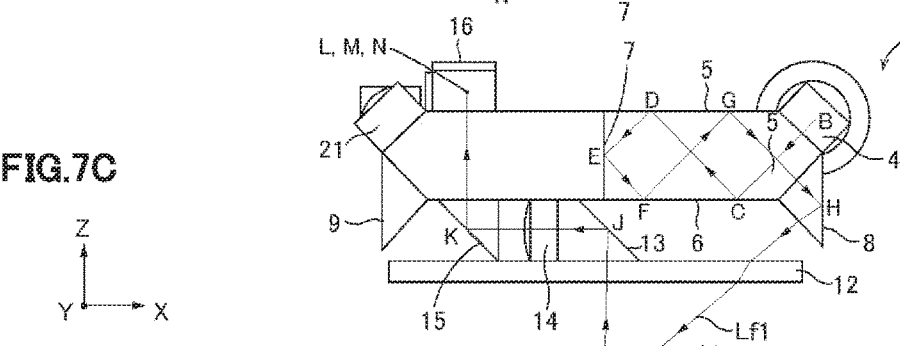
Figure 7D:
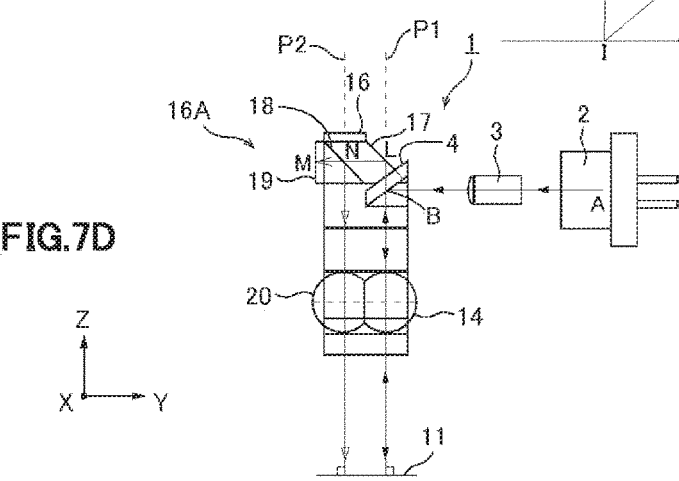

Next, explaining about light path of the first light flux Lf1 in the displacement detecting device relating to one embodiment of the present invention by using drawings. FIG. 7A to FIG. 7D are drawings illustrating light path of the first light flux in the displacement detecting device relating to one embodiment of the present invention, and FIG. 7A is a back view, FIG. 7B is a plan view, FIG. 7C is a front view, and FIG. 7D is a side view.

As illustrated in FIG. 7B, light flux emitted from point A, which is a light emitting point of a light source 2, enters into a prism having mirror surfaces 5 and 6 and a polarized beam splitter surface 7, after reflected by a mirror 4. Also, for the mirror 4, it is desirable that a reflection film, which do not change a polarized state before and after reflection, will be formed. At this time, the light flux is reflected by the mirror surfaces 5 and 6. In the mirror surfaces 5 and 6, reflection film is formed, and this reflection film does not change a polarized state of a reflected light flux, and reflects a light flux entering in approximately 45 degrees, and transmits a light flux entering approximately vertically.

When fixing parts to the mirror surfaces 5 and 6, a light path portion should be having a gap, or when adhering prism and else directly, unillustrated thin glass made of same glass material as the prism and else is attached to entire mirror surfaces 5 and 6, and the prism and else is adhered thereon by index matching adhesive agent. In this case, the reflection film is having the above reflection performance in the state that the thin glass is attached thereon.

As illustrated in FIG. 7C, the light flux passes through point B to point C to point D to point E, and enters the polarized beam splitter surface 7. At this surface, P polarized component of the light flux will be transmitted, and S polarized component of the light flux will be reflected. The intensity ratio of the transmitted light and the reflected light at this time is 1:1.

The S polarized component (light flux Lf1) passes through point F to point G to point H, and deflected by a deflection mirror 8 such that incident angle into the diffraction grating 11 will be prescribed angle −θ1. If diffraction angle at the diffraction grating 11 is θ2, the relation of θ1 and θ2 will be indicated by the following formula (5).

$$\sin\theta_2 = \frac{-m \cdot \lambda}{\Lambda} - \sin(-\theta_1) \qquad (5)$$

Λ: grating pitch λ: wavelength of incident light m: diffraction degree
  θ1: incident angle
  θ2: diffraction angle
  θ1>0, m>0
  (When measuring angle from normal line of grating to light beam, counter clockwise will be positive.)

At this time, θ2 may be in the range that light path passing through point I to point J to point K can pass through within effective opening of the lens 14 for correcting light path, but the value in proximity to 0 is preferable, in order to make aberration outside the axis as small as possible, which occurs at the lens 14 for correcting light path. When diffraction angle of m degree light is θ2=0, diffraction angle of −2 m degree light will be −θ1, so −2 m degree light will be returned to the light source 2 from point I to point H to point G to point F to point E to point D to point C to point B to point A. Therefore, in the present embodiment, θ2=0 is avoided, and set to an angle that −2 m degree light will not be returned to the light source 2. Also, as illustrated in FIG. 7D, incident angle of the light flux Lf1 seen from X axis direction is arranged to be vertical to the diffraction grating 11.

As illustrated in FIG. 7C, the light flux Lf1 diffracted by the diffraction grating 11 will be reflected by the mirror 13 after proceeding from point I to point J, and passes through the lens 14 for correcting light path, then reflected by the mirror 15 and passes through point K to point L, and enters prism unit 16A (16, 17, 18, 19) for shifting light path.

As illustrated in FIG. 7D, the light flux Lf1 entered the prism unit 16A (16, 17, 18, 19) for shifting light path will be reflected by the mirror 17 and enters the polarized beam splitter 18. With respect to this polarized beam splitter 18, the polarizing direction of the light flux Lf1 will be P polarization, so it passes through the polarized beam splitter surface 18, and reflected by ¼ wavelength plate 19, the back surface of which is being reflection surface, and the polarization plane is rotated for 90 degrees to be S polarization, and re-enters the polarized beam splitter 18.

Then, the light flux Lf1 is reflected by the polarized beam splitter 18, and as illustrated in FIG. 7A, proceeds from point N to point O, reflected by the mirror 15, passes through the lens 20 for correcting light path having focus distance equal to the lens 14 for correcting light path, reflected by the mirror 13, proceeds from point P to point Q, and re-enters the diffraction grating 11. As such, the light path shifts to be on the plane P2 from the plane P1 illustrated in FIG. 7B and FIG. 7D, after passing through the prism unit 16A for correcting light path.

Figure 8A:
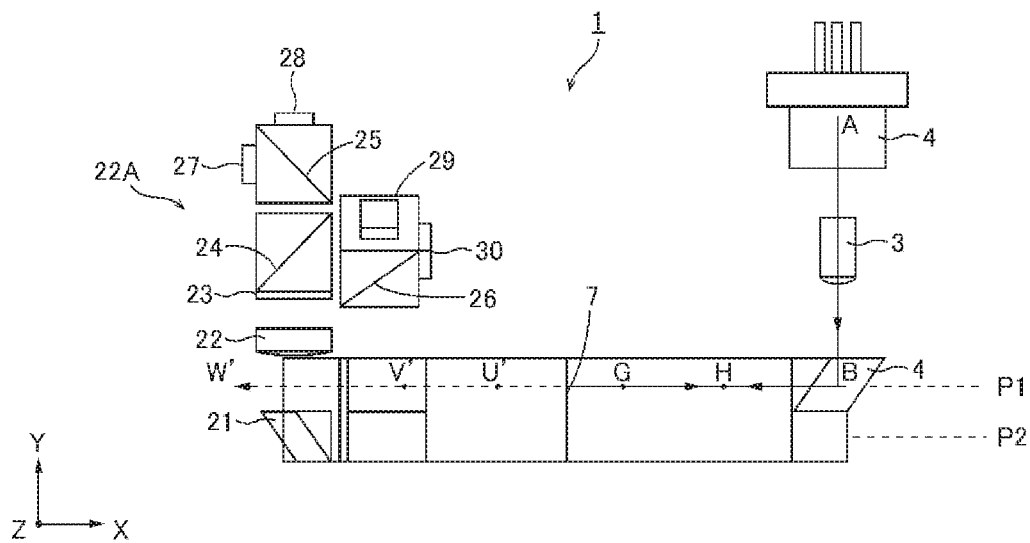
FIG. 8A and FIG. 8B are drawings illustrating light path of 0 degree light in the displacement detecting device relating to one embodiment of the present invention.
Figure 8B:
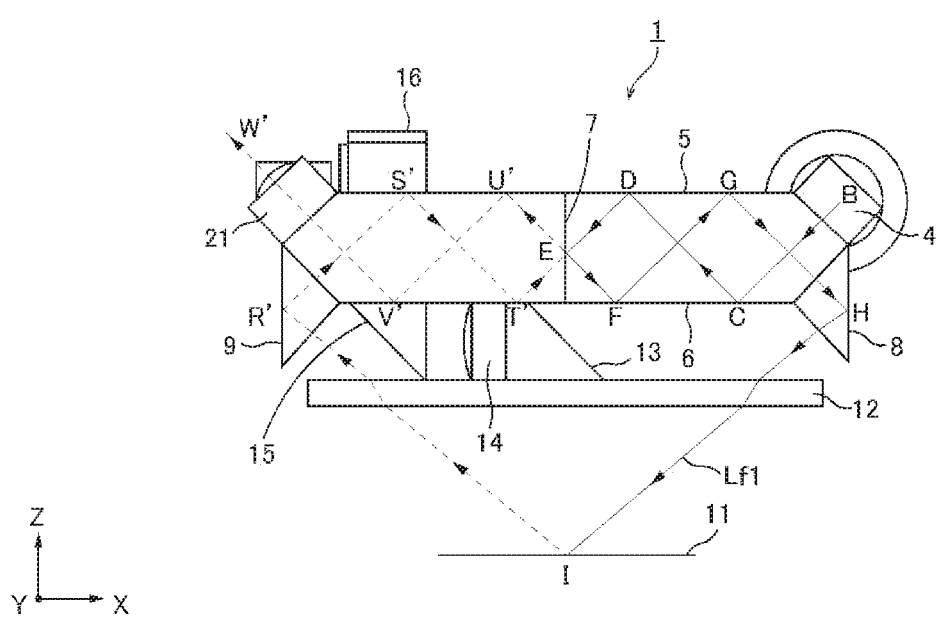

Next, explaining about the effect of shifting the light path from the plane P1 to the plane P2 by using drawings. FIG. 8A and FIG. 8B are drawings illustrating light path of 0 degree light in the displacement detecting device relating to one embodiment of the present invention, and FIG. 8A is a plan view, and FIG. 8B is a front view.

In FIG. 8B, a light path I to R' to S' to T' to E to U' to V' to W' illustrated by broken line indicates a light path of 0 degree diffraction light at the diffraction grating 11. As illustrated in FIG. 8A, the shift of light path from the plane P1 to the plane P2 does not occur in this light path, so it does not enter the mirror 21 introducing the light flux to the interfered light receiving unit 22A (22 to 30), therefore, it can be understood that it does not mix into the receiving surface of the photodiodes 27, 28, 29 and 30. Same applies to the light flux Lf2, and the shift of light path from the plane P1 to the plane P2 does not occur in the light path of 0 degree diffraction light, so it can be understood that it does not mix into the receiving surface of the photodiodes 27, 28, 29 and 30.

Also, it will not be explained by using drawings, but, by following the light path as well as the above, it can be understood that the mixing into the receiving surface of photodiodes 27, 28, 29 and 30 of +m degree light of the light flux Lf1 and −m degree light of the light flux Lf2 at the time of first and second entering, and also, the re-entering into the light source 2 of 0 degree light of the light fluxes Lf1 and Lf2 at the time of second entering, can be avoided by the effect of the above shift of light path.

As explained in the above, −2 m degree light of the light flux Lf1 and 2 m degree light of the light flux Lf2 return to direction of the light source, and do not enter into photodiodes 27, 28, 29 and 30, which is the light receiving element of the interfered light receiving unit 22A. As explained in the above, the entering into the light source 2 can be avoided by setting θ2 to an appropriate value.

As such, in the present embodiment, it is possible to prevent the unnecessary light other than −m degree light of the light flux Lf1 and +m degree light of the light flux Lf2 used for measuring displacement from mixing into the receiving surface of the photodiodes 27, 28, 29 and 30, and from reentering into the light source 2, by the function of the prism unit 16A (16, 17, 18, 19) for shifting light path. Therefore, in the present embodiment, there is no occurrence of error or increase of noise caused by mixing of the unnecessary light into the receiving surface or reentering of unnecessary light into the light source, so stable and accurate measurement will be possible.

Figure 9A:
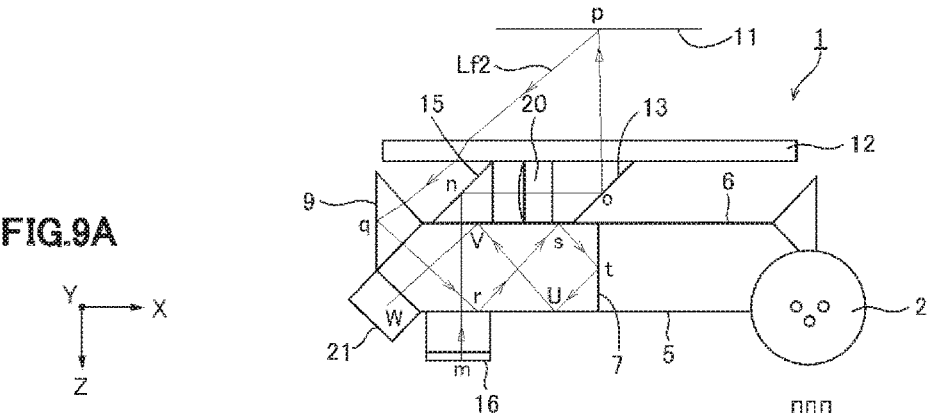
FIG. 9A to FIG. 9D are drawings illustrating light path of second light flux in the displacement detecting device relating to one embodiment of the present invention.
Figure 9B:
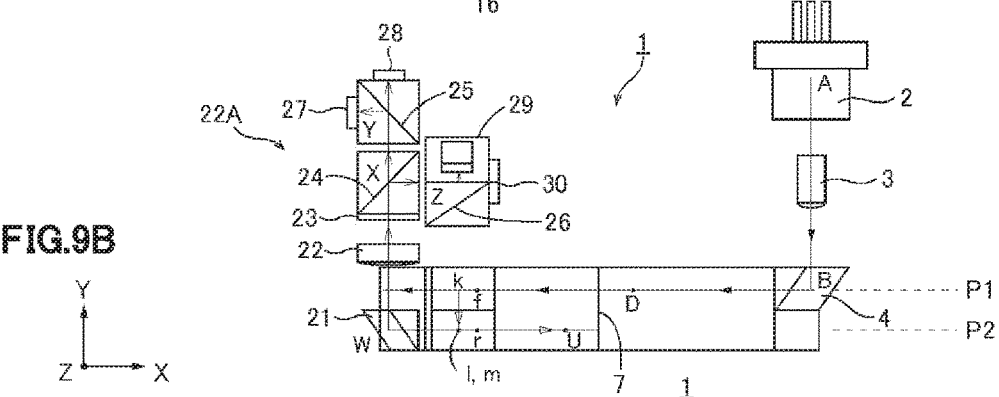
Figure 9C:
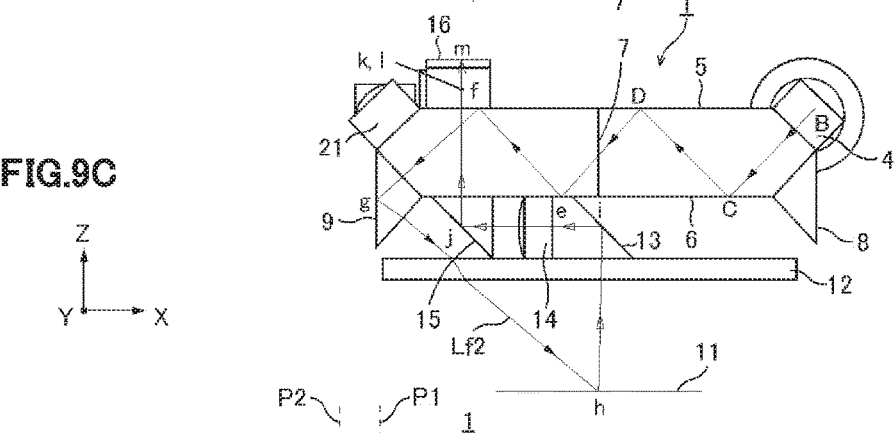
Figure 9D:
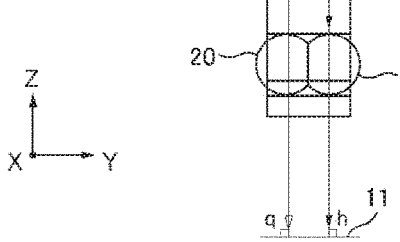

Next, explaining about light path of the second light flux Lf2 in the displacement detecting device relating to one embodiment of the present invention by using the drawings. FIG. 9A to FIG. 9D are drawings illustrating light path of second light flux in the displacement detecting device relating to one embodiment of the present invention, and FIG. 9A is a back view, FIG. 9B is a plan view, FIG. 9C is a front view, and FIG. 9D is a side view.

As illustrated in FIG. 9B and FIG. 9C, the light flux emitted from a light emitting point A of the light source 2 proceeds from point A to point B to point C to point D, and splits into the light flux Lf1 (S polarized component) and the light flux Lf2 (P polarized component) having equal intensity by the polarized beam splitter 7. As illustrated in FIG. 9C, the light flux Lf2 of P polarized component proceeds from point e to point f to point g, and deflected by the deflection mirror 9 such that the incident angle into the diffraction grating 11 will be prescribed angle θ1. If diffraction angle at the diffraction grating 11 is θ2, the relation between θ1 and θ2 will be indicated by the following formula (6).

$$\sin(-\theta_2) = \frac{^+m \cdot \lambda}{\Lambda} - \sin\theta_1 \qquad (6)$$

The range of value of θ2 is similar as the light flux Lf1. As illustrated in FIG. 9C, the light flux Lf2 diffracted by the diffraction grating 11 proceeds from point h to point I, reflected by the mirror 13, passes through the lens 14 for correcting light path, reflected by the mirror 15, passes through point j to point k, and as illustrated in FIG. 9D, enters into the prism unit 16A (16, 17, 18, 19) for shifting light path.

As illustrated in FIG. 9D, the light flux Lf2 entered into the prism unit 16A (16, 17, 18, 19) for shifting light path will be reflected by the mirror 17 and enters the polarized beam splitter 18. With respect to this polarized beam splitter 18, the polarizing direction of the light flux Lf2 will be S polarization, so it will be reflected by the polarized beam splitter surface 18, and reflected by ¼ wavelength plate 16, the back surface of which is being reflection surface, and the polarization plane is rotated for 90 degrees to be P polarization, and passes through the polarized beam splitter 18.

As illustrated in FIG. 9A, the light flux Lf2 proceeds from point m to point n, and then, reflected by the mirror 15 and passes through the lens 20, reflected by the mirror 13, proceeds from point o to point p, and reenters into the diffraction grating 11. As illustrated in FIG. 9B and FIG. 9D, light path shifts to be on the plane P2 from the plane P1, after passing through the prism unit 16A (16, 17, 18, 19) for shifting light path.

The shape of the prism unit 16A for shifting light path is set such that light path length of the light flux Lf1 and the light flux Lf2 at the time of passing through the prism unit 16A (16, 17, 18, 19) for shifting light path will be equal with each other. For example, thickness of ¼ wavelength plates 16 and 19 will be equal with each other, and inclination of the inclined surface of the mirror 17 and the polarized beam splitter surface 18 will be 45 degrees.

After passing through the lens 20, the light flux Lf2 reentered the diffraction grating 11 proceeds from point p to point q, reflected by the mirror 9, reenters into the prism with reflection surfaces 5 and 6 and the polarized beam splitter 7, reflected by the mirrors 5 and 6, proceeds from point r to point s, reflected by the polarized beam splitter 7 as the polarization is S polarization this time, superposed with the light flux Lf1, reflected by the mirrors 5 and 6 and proceeds from point t to point U to point V to point W, reflected by the mirror 21, and proceeds to the lens 22 of the interfered light receiving unit 22A. Then, as mentioned above, it will be received by the photodiodes 27, 28, 29 and 30 of the interfered light receiving unit 22A.

As mentioned above, it is explained about light path of the first light flux Lf1 and light path of the second light flux Lf2, but light path length of the light flux Lf1 from the light source 2 to the receiving surface of the photodiodes 27, 28, 29 and 30 and light path length of the light flux Lf2 will be equal with each other. In the present embodiment, the light source 2 with relatively short coherent distance is used, so when light path lengths of the light fluxes Lf1 and Lf2 are equal with each other, it is possible to obtain an interference signal with large amplitude by interfering at the peak of visibility curve. In other words, it is possible to equalize the light path lengths of the light fluxes Lf1 and Lf2 by adjusting the position of the mirrors 8 and 9, in order to maximize the amplitude of the interference signal of the light fluxes Lf1 and Lf2.

As such, it is possible to eliminate an error occurred by the fluctuation of wavelength of the light source 2, by equalizing the light path lengths. In the present embodiment, when there is a difference of Δa in the light path lengths after superposing the light fluxes Lf1 and Lf2 at the splitting surface of the polarized beam splitter 7, an error of ΔE illustrated in the following formula (7) occurs when wavelength of the light source changes for Δλ.

$$\Delta E = \frac{\Delta \lambda}{\lambda^2} \cdot \Delta a \cdot \frac{\lambda}{4} \quad (7)$$

Δλ occurs by the change of humidity, atmospheric pressure, and temperature of the light source, so when Δa is not 0, ΔE occurs by these changes, and as a result, an error occurs in the measurement result. Adversely, if Δa=0, stable measurement not influenced by these changes will be possible.

Figure 10A:
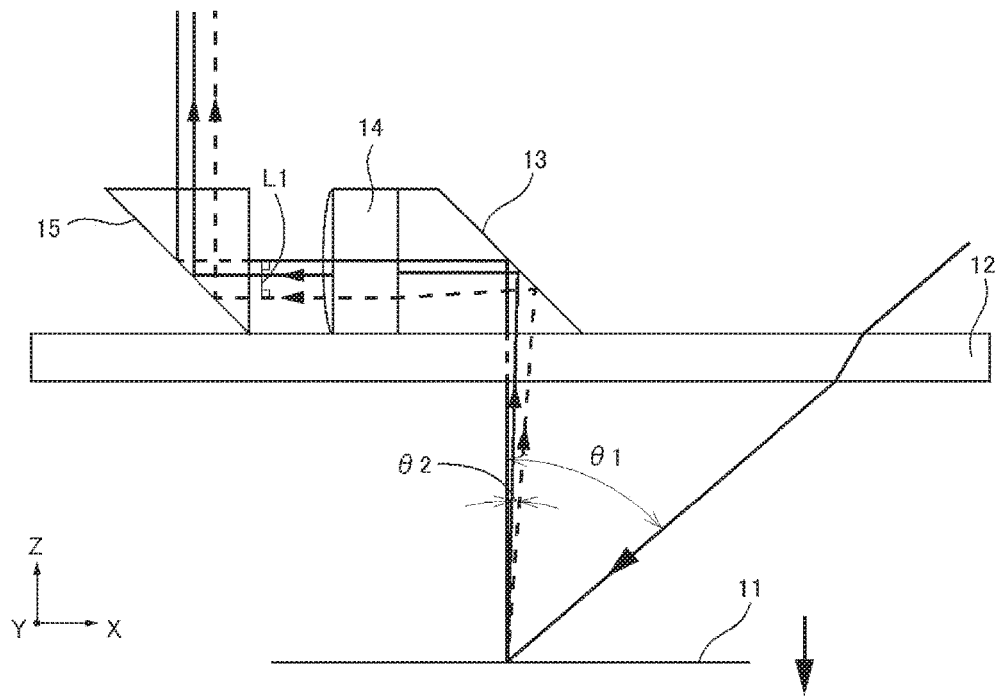
FIG. 10A and FIG. 10B are explanatory drawings of one embodiment of function by lens for correcting light path in the displacement detecting device relating to one embodiment of the present invention.
Figure 10B:
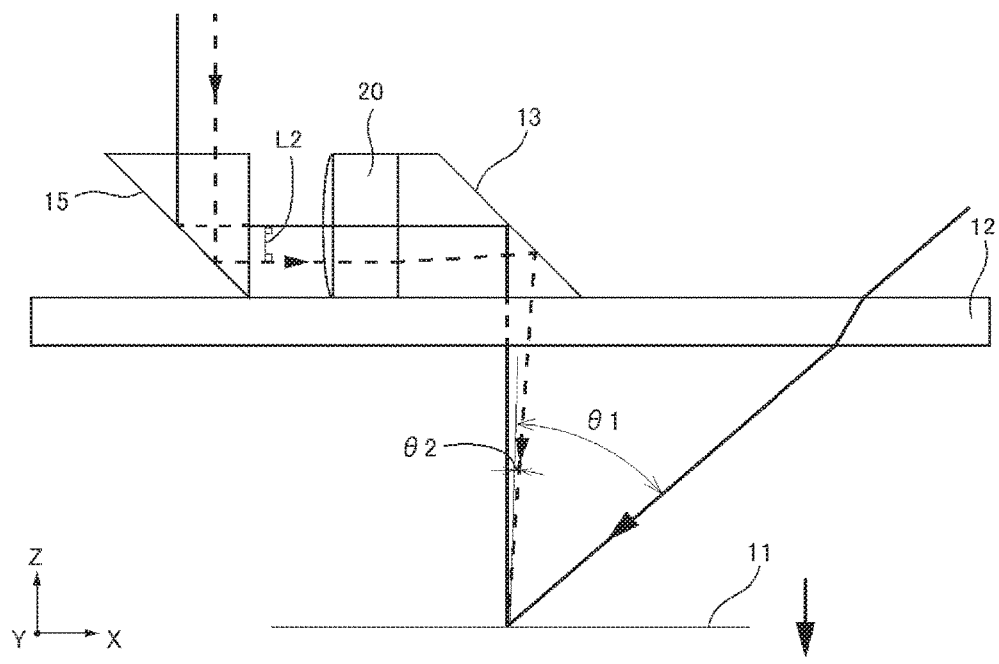

Next, explaining about the function of the lenses 14 and 20 for correcting light path, when the diffraction grating is inclined, by using the drawings. FIG. 10A and FIG. 10B are explanatory drawings of one embodiment of function by lens for correcting light path in the displacement detecting device relating to one embodiment of the present invention.

FIG. 10A illustrates light path of light beam passing through the lens 14 for correcting light path, and in the drawing, one dot chain line illustrates central axis of the lens, solid line illustrates light path before inclination of the diffraction grating, broken line illustrates light path after inclination of the diffraction grating. As illustrated in FIG. 10A, by the inclination of the diffraction grating 11, light path deviates for shift amount L1 from the solid line to the broken line, but the focus of the lens 14 for correcting light path is on the grating surface, so light path after passing through the lens 14 will always be parallel to the central axis of the lens 14.

Therefore, as illustrated in FIG. 10B, light beam entering into the lens 20 for correcting light path after passing through the prism unit 16A (16, 17, 18, 19) for shifting light path will also be parallel to the central axis of the lens 20 for correcting light path, and also, shift amount L2 from the central axis will be L2=L1.

From this point, second incident angle into the diffraction grating 11 will be same as the first diffraction angle θ2, so it can be understood that the second diffraction angle will be same as the first incident angle with −θ1. In other words, when seen from Y axis direction, the direction of the second diffraction light will always coincide with the direction of the first incident light. Therefore, it can be understood that there will be no change in light path (Q to Z) after second diffraction before and after the inclination of the diffraction grating 11.

Also, in FIG. 10A and FIG. 10B, the light path length of light path illustrated by the broken line is equal to the light path length of light path before inclination of the diffraction grating 11, by the function of the lens 14 for correcting light path in which all the light path lengths will be equal after light beam from the focus position passes through the lens. Therefore, it can be understood that there is no change in the light path length of the entire light path (A to Z).

In addition, in FIG. 10A and FIG. 10B, it is explained only about the light flux Lf1, but similarly, also in the light flux Lf2, the second diffraction angle will always be equal to the first incident angle, so it can be understood that there is no change in the light path (q to z) after second diffraction before and after the inclination of the diffraction grating 11. Also, there is no change in the light path length of the entire light path (a to z).

As mentioned above, by the function of the lenses 14 and 20 for correcting light path, even when the diffraction grating 11 is inclined, the entire light path length of the light fluxes Lf1 and LF2 will not be changed, and there will be no change in the light path until the light receiving element after the second diffraction. Therefore, there will be no change in the interference signal when two light fluxes Lf1 and Lf2 are interfered, so it can be understood that there will be no error such that it will be in the state that it is moved to the X axis direction by the inclination of the diffraction grating 11.

Figure 11A:
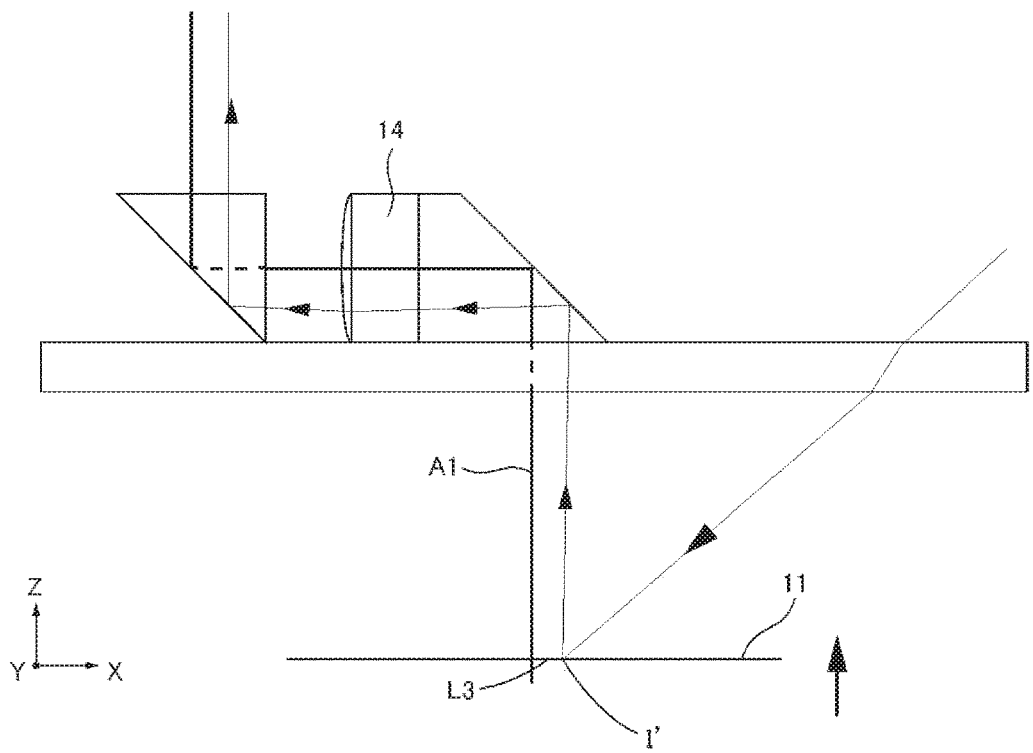
FIG. 11A and FIG. 11B are explanatory drawings of another embodiment of function by lens for correcting light path in the displacement detecting device relating to one embodiment of the present invention.
Figure 11B:
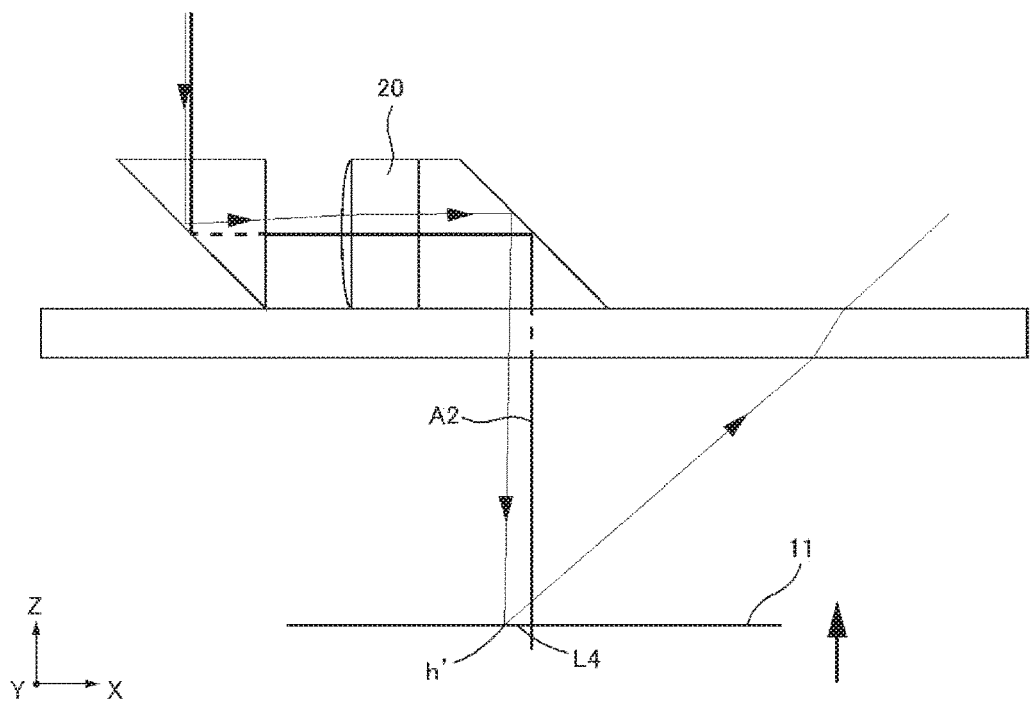

Next, explaining about the function of the lenses 14 and 20 for correcting light path, when the diffraction grating 11 is displaced in Z axis direction, by using the drawings. FIG. 11A and FIG. 11B are explanatory drawings of another embodiment of function by lens for correcting light path in the displacement detecting device relating to one embodiment of the present invention, and FIG. 12 is a detailed drawing for explaining another embodiment of function by lens for correcting light path in the displacement detecting device relating to one embodiment of the present invention.

As illustrated in FIG. 11A, when the diffraction grating 11 moves to arrow direction (Z axis direction), incident point of the light flux Lf1 moves from I to I'. The position relation of the diffraction grating 11 to the lens 14 for correcting light path to the lens 20 for correcting light path to the diffraction grating 11 is as FIG. 5, so when considering the grating surface at the time of first entering into the diffraction grating 11 as substance surface and considering the grating surface at the time of second entering into the diffraction grating 11 as image surface, lateral magnification of an optical system of FIG. 5 will be single. Also, even when the diffraction grating 11 moves to Z axis direction, the central axis of the lens coincides with the symmetrical axis, which is a normal line of the grating surface, so the symmetrical axis and the central axis of the lenses 14 and 20 do not deviate with each other.

Therefore, as illustrated in FIG. 11B, if second incident point into the diffraction grating 11 after passing through the lens 20 for correcting light path is h', and if distance between I' and the symmetrical axis A1 is L3, and if distance between h' and the symmetrical axis A2 is L4, L3 is approximately equal to L4 if the displacement in Z axis direction is in a certain range. When the light flux moves on the diffraction grating 11, phase of the light flux changes, but in the case of FIG. 11A and FIG. 11B, L3 and L4 are approximately equal and moving in opposite direction to each other, so phase change will be offset and very small.

Figure 12:
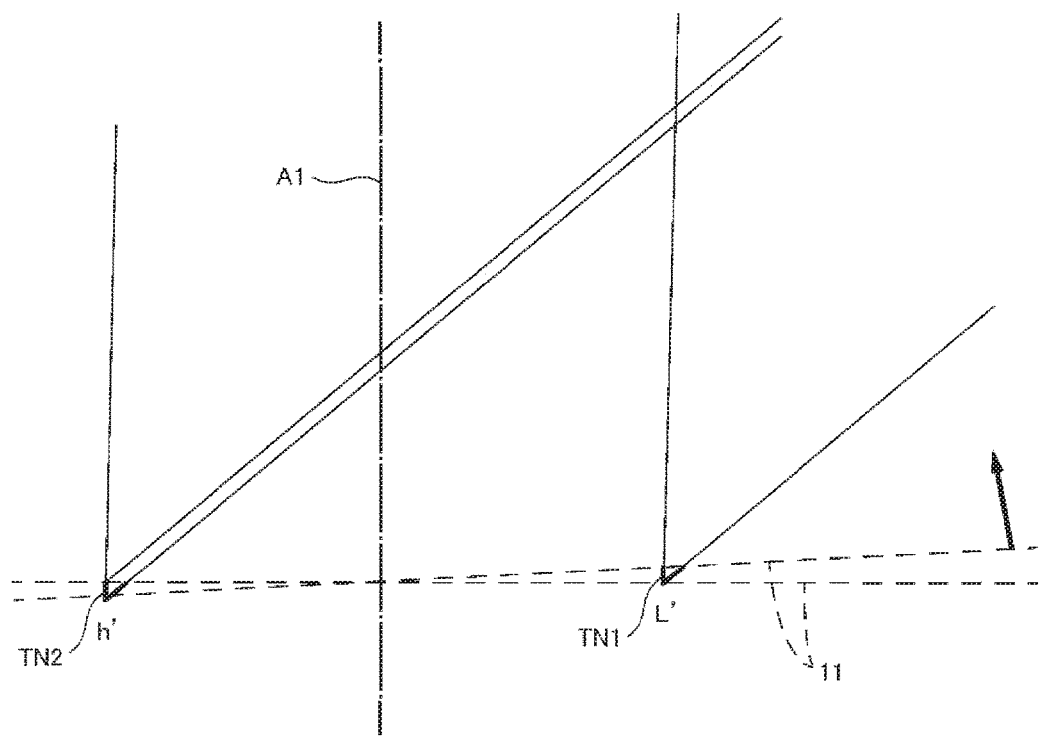
FIG. 12 is a detailed drawing for explaining another embodiment of function by lens for correcting light path in the displacement detecting device relating to one embodiment of the present invention

The case that the diffraction grating 11 inclines from this state is illustrated in FIG. 12. As illustrated in FIG. 12, when the diffraction grating 11 inclines to arrow direction, light path will be shorter only for thick line part TN1 at L' side of first entering, and light path will be longer only for thick line part TN2 at h' side of second entering, but L3 is approximately equal to L4, so lengths of two thick line parts will be approximately equal, and change of light path length will be offset and very small.

About change of light path according to change of diffraction angle according to inclination of the diffraction grating 11, if moving amount in Z direction is within a certain range, the explanation in FIG. 10A and FIG. 10B can be applied, so change of light path after second diffraction will be very small, and also, change of entire light path length will be very small.

In FIG. 11A and FIG. 11B, it is explained only about the light flux Lf1, but it can be explained similarly for the light flux Lf2. Also, in FIG. 11A and FIG. 11B, along with the movement of the diffraction grating 11 in arrow direction, not only the incident point moves, but also the entire light path length changes, but the light fluxes Lf1 and Lf2 enter symmetrically with respect to the symmetrical axis A1, so changing amount of light path length of the light fluxes Lf1 and Lf2 will be equal, thus there will be no change in the interference signal of the light fluxes Lf1 and Lf2.

As such, in the present embodiment, the measurement with little measurement error will be possible, even when the diffraction grating 11 inclines or displaces in Z axis direction, by the function of the lenses 14 and 20 for correcting light path.

In addition, it is explained in detail about one embodiment of the present invention as above, but it can be easily understood by those who skilled in the art that many variations are possible without practically departing from new matters and effect of the present invention. Therefore, such variants are all included within the scope of the present invention.

For example, in the description or drawings, the terms described together with different terms having broader or same meaning at least once can be replaced by that different terms in any part of the description or drawings. Also, configuration and operation of the displacement detecting device is not limited to the invention explained in one embodiment of the present invention, and various modifications can be performed.

Concretely, in the above one embodiment of the present invention, light emitted from the light source may be supplied not only through gas, but also through space in vacuum or in liquid. Also, the displacement detecting device relating to one embodiment of the present invention can be applied to various displacement detecting devices, such as displacement detecting device for performing three-dimensional measurement combined with displacement detecting device for detecting displacement in height direction or rotary encoder in which the diffraction grating rotates in parallel to its plane. Further, in the displacement detecting device relating to one embodiment of the present invention, it is explained about the example using reflection type diffraction grating, but it is not limited to this type, and transmission type diffraction grating which transmits first and second light fluxes may be used.

GLOSSARY OF DRAWING REFERENCES

1 Displacement Detecting Device
2 Light Source
3 Collimate Lens
4, 5, 6, 13, 15, 17, 21 Mirror
8, 9 Deflection Mirror
7, 18, 25, 26 Polarized Beam Splitter (Light Flux Splitting Element)
11 Diffraction Grating
12 Cover Glass
14, 20 Lens for Correcting Light Path
16 ¼ Wavelength Plate with Back Surface Mirror
16A Prism unit for Shifting Light Path
19 ¼ wavelength plate
22 Lens
22A Interfered light Receiving unit
23 ¼ Wavelength Plate
24 Unpolarized Beam Splitter
27, 28, 29, 30 Photodiode
40 Relative Position Detector
41 Differential Amplifier
42 A/D Converter
43 Waveform Correction Processing Unit
44 Incremental Signal Generator

The invention claimed is:

1. A displacement detecting device for detecting relative displacement in one direction of a measuring object by a movement of a diffraction grating, comprising:
a light source for emitting coherent light;
a collimate lens for making the coherent light emitted from the light source into parallel light flux;
a beam splitter for splitting collimate light, which has been made into parallel light flux by the collimate lens, into two light fluxes;
deflection mirrors for deflecting each of split light fluxes to enter the diffraction grating at prescribed angle;
two lenses for correcting light path with equal focus distance arranged in light path of the light fluxes;
a prism unit for shifting light path to reenter first diffracted light, which is diffracted in the diffraction grating, into the diffraction grating by shifting the light path of the first diffracted light for prescribed distance in a direction perpendicular to a measuring direction in which a grating structure of the diffraction grating is aligned at a certain period;
an interfered light receiver for receiving light by interfering diffracted light, which was moved in parallel in the prism unit for shifting light path, re-diffracted in the diffraction grating and superposed in the beam splitter; and
a relative position detector for outputting displacement information of the diffraction grating based on interfered light intensity,
wherein each of the light fluxes split in two by the beam splitter enters the diffraction grating at incident angle that diffraction angle will be approximately vertical to the diffraction surface of the diffraction grating and such that the light fluxes will be symmetrical with normal line of grating surface of the diffraction grating as symmetrical axis, and
the two lenses for correcting light path are arranged such that one focus of one lens for correcting light path is on the grating surface, and another focus of the one lens for correcting light path is arranged to coincide with one focus of another lens for correcting light path, and
wherein another focus of another lens for correcting light path is on the grating surface, and one lens for correcting light path is arranged coaxially with the symmetrical axis, and another lens for correcting light path is arranged coaxially with the symmetrical axis projected on a plane moved in parallel from a plane formed by the light fluxes.

2. The displacement detecting device according to claim 1, wherein a shifting amount of the prescribed distance is set to a distance that 0 degree diffracted light can deviate from an opening of the interfered light receiver.

3. The displacement detecting device according to claim 1, wherein the prism unit for shifting light path comprises:
¼ wavelength plate with back surface mirror;
¼ wavelength plate; a mirror; and
a polarized beam splitter, wherein the ¼ wavelength plate with back surface mirror and the ¼ wavelength plate are having same thickness, and also, arranged to be perpendicular to each other, the polarized beam splitter may be arranged to be inclined 45 degrees with respect to horizontal direction between the ¼ wavelength plate with back surface mirror and the ¼ wavelength plate, and the mirror is arranged in parallel with the polarized beam splitter via prescribed distance.

4. The displacement detecting device according to claim 2, wherein the prism unit for shifting light path comprises:
¼ wavelength plate with back surface mirror;
¼ wavelength plate; a mirror; and
a polarized beam splitter, wherein the ¼ wavelength plate with back surface mirror and the ¼ wavelength plate are having same thickness, and also, arranged to be perpendicular to each other, the polarized beam splitter may be arranged to be inclined 45 degrees with respect to horizontal direction between the ¼ wavelength plate with back surface mirror and the ¼ wavelength plate, and the mirror is arranged in parallel with the polarized beam splitter via prescribed distance.

\* \* \* \* \*